United States Patent [19]
Lohr, Jr. et al.

[11] 3,878,150
[45] Apr. 15, 1975

[54] STABILIZED POLYBUTADIENE RESINS

[75] Inventors: Delmar F. Lohr, Jr.; Edward Leo Kay, both of Akron, Ohio

[73] Assignee: The Firestone Tire & Rubber Company, Akron, Ohio

[22] Filed: Apr. 16, 1973

[21] Appl. No.: 351,689

[52] U.S. Cl.... 260/23.7 R; 260/23.7 M; 260/45.75; 260/45.75 R; 260/45.75 N; 260/45.75 C; 260/45.85 B
[51] Int. Cl.......................... C08c 11/72; C08d 9/14
[58] Field of Search....... 260/45.75 C, 23.7 R, 78.5, 260/23.7 M, 41 A, 45.75, 45.85 B, 45.75 N, 45.75 R

[56] References Cited
UNITED STATES PATENTS

| | | | |
|---|---|---|---|
| 2,985,617 | 5/1961 | Salyer | 260/45.85 R |
| 3,027,351 | 3/1962 | Lichty | 260/45.85 |
| 3,189,630 | 6/1965 | Smutney | 260/45.75 C |
| 3,196,134 | 7/1965 | Donat | 260/78.5 |
| 3,651,110 | 3/1972 | Ward | 260/45.75 N |
| 3,681,276 | 8/1972 | Nagahisa | 260/23.7 R |
| 3,689,450 | 9/1972 | Warner | 260/23.7 M |

OTHER PUBLICATIONS

Skeist, "Handbook of Adhesives," 1962, p. 420.

*Primary Examiner*—Melvyn I. Marquis
*Assistant Examiner*—William E. Parker

[57] ABSTRACT

The incorporation of a combination of a hydroxyaryl carboxylic acid or a salt or ester thereof, into a polybutadiene resin greatly enhances the resistance thereof to thermo-oxidative deterioration.

15 Claims, No Drawings

STABILIZED POLYBUTADIENE RESINS

FIELD OF THE INVENTION

This invention relates to butadiene polymer and copolymer resins, and more particularly to increasing the resistance of such resins to thermo-oxidatise deterioration of the mechanical properties.

BACKGROUND OF THE INVENTION

Butadiene polymer and copolymer resins, particularly those having, in uncured state, a high proportion of butadiene units incorporated in 1,2-configuration, have come into considerable use, particularly as electrically insulating structural components, friction elements and the like. Particularly since these resins exhibit good mechanical properties, at least initially, at high temperatures, they are attractive candidates for applications in which they will be exposed to high temperatures. At temperatures above about 600°F. (316°C.), however, the mechanical properties of these resins tend to slowly degrade over a period of time, which excludes them from many applications for which they would otherwise be very suitable. To date, however, there does not appear to have been any successful development of enhanced heat-resistant resins of this type.

Accordingly, it is an object of this invention to increase the resistance of butadiene polymer and copolymer resins to deterioration by heat and air.

Another object is to provide such heat resistant resins which will have physical and chemical properties undiminished in comparison with these resins as heretofore supplied.

A further object is to improve the heat resistance of such resins by incorporating therein modest amounts of compounding ingredients which are inexpensive and readily available, and which present no dangers or inconvenience involving toxicity, corrosiveness or the like.

SUMMARY OF THE INVENTION

The above and other objects are secured, in accordance with this invention in compositions comprising:

|  | Parts by Weight |
|---|---|
| Polybutadiene or copolymer resin | 100 |
| A hydroxyaryl carboxylic acid or a salt or ester thereof | 0.5–5.0 |
| A metal soap | 0.5–5.0 |

The composition being cured by heating with presence of:

| A peroxide curing agent | 0.5–6.0 |
|---|---|

The above ingredients are, of course, exclusive of other filling, reinforcing and compounding ingredients such as glass fiber, glass fabric, asbestos, flame resisters, and the like.

DESCRIPTION OF THE PREFERRED EMBODIMENTS

The Polybutadiene Resins

These may be any resins which are based on polymers of butadiene or copolymers of butadiene with up to 60%, based on the copolymers, of styrene. Also minor proportions, say up to 15% based on the copolymer of other ethylenically unsaturated compounds may be incorporated in the copolymers. These resins are usually prepared by (co) polymerizing the monomers by means of free radical or anionic catalysts to a relatively low molecular weight, say 1000–200,000, so that they are of at least a flowable consistence. These low molecular weight (co) polymers are then incorporated with any desired fillers, reinforcing fibers or fabrics, pigments, etc., peroxide or other curing agents if desired, etc., and the composite is cured under heat and pressure to produce the desired finished article.

More particularly, there have recently been developed a class of polybutadiene resins having at least 40%, and preferably at least 60% by weight, of butadiene in the polymer molecule, and having at least 80% by weight of the butadiene therein in the vinyl type of butadiene repeating unit structure. The average molecular weight (determined by intrinsic viscosity measurement) is at least 12,500 and the molecular weight distribution is such that at least 50%, and preferably 90%, of the polymer has a molecular weight above 10,000 and at least 95% has a molecular weight above 2,000. It has been found that the presence of higher proportions of lower molecular weight polymers than allowed by these limitations causes slow curing rates and poor physical properties in the cured product. For good processibility and good flow during molding the average molecular weight should be no greater than 55,000. This corresponds to an intrinsic viscosity of about 0.7 taken at 25°C. or about 0.68 taken at 30°C. The resin should also have a dilute solution viscosity of 0.2–0.7, preferably 0.3–0.6. The butadiene units are incorporated into the polymeric chain largely in the 1,2-configuration, preferably at least 80% of the butadiene units present being in this configuration. These polymers are cured by incorporating, per 100 parts of polymer, approximately 0.5–6 parts, and preferably 1.5–3.0 parts, by weight of dicumyl peroxide (or an equivalent weight of any other peroxide giving radicals of the structure $R_2(CH_3)CO.$, where R independently in each occurrence represents a hydrocarbon radical of 1–20 carbon atoms), and heating the polymers, usually under pressure. The curing temperature is advantageously at least 250°F.(121°C.), preferably about 300°–350°F. (149°–177°C.). Generally, no advantage in the process or product is obtained by exceeding a temperature of 420°F. (216°C.). Obviously, the higher the temperature the shorter will be the curing time required. Generally at 350°F. (177°C) a satisfactory cure is obtained in less than 4 minutes, and in some cases even within a few seconds. Cure times of more than four minutes usually provide no added advantage. Where fast cures are desired it is necessary to use a filler to avoid crazing or cracking. A filler, such as silica, is advantageously used in the proportion of 25–65, preferably 40–60, volume percent based on the combined resin-filler composition. Also the resins may be incorporated with glass fiber, either as chopped filler or else as glass fabric in a laminate, in which case the glass fiber will serve the purpose of a filler in preventing crazing and cracking on fast cures.

More particularly with regard to the inclusion of fillers, the present invention is of particular advantage in the stabilization of compositions containing silica fillers in amounts of 100 to 500 parts by weight per 100 parts by weight of butadiene polymer or copolymer. In such cases it is desirable to include 0.05 to 2.0 parts per 100 parts of silica of an agent for bonding the filler to the polybutadiene resin such as an unsaturated-group-containing silane on the order of vinyl triacetoxysilane, vinyl tributoxy silane, vinyl trimethoxysilane, and vinyl triethoxysilane.

The Metal Soap

This may be any metal salt and preferably a Group II-A or II-B metal salt of an organic acid containing from 8 to 26 carbon atoms such as calcium 2-ethylhexanoate, calcium octoate, calcium laurate, calcium myristate, calcium stearate, calcium palmitate, calcium oleate, calcium arachidate, calcium abietate, magnesium stearate, magnesium octoate, magnesium oleate, zinc stearate, zinc oleate, zinc laurate, zinc abietate, cadmium stearate, and the like, and mixtures of any two or more of such salts in any proportions.

The Hydroxyaryl Carboxylic Acids and Derivatives Thereof

The hydroxyaryl carboxylic acids, esters and salts may be illustrated by the following generalized formulae:

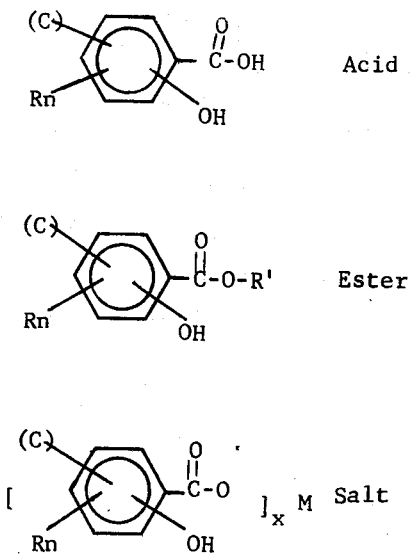

in which the hydroxyaryl function may be ortho, meta or para to the carboxyl, ester or salt function. R may be a hydrogen atom or a hydrocarbon group or groups containing from one to about 24 carbon atoms. These carbon atoms may be arranged as a straight or branched alkyl function or as a cyclic function or combinations thereof. The carbon atoms may also be present as an aromatic structure.

The designation (C+) is used to denote that it is possible to form methylenebis or tris compounds. Generally, it is too difficult to prepare a tris compound because of steric hindrance. However, we have found that a methylenebis compound, specifically, 3,3'-methylenebis(5-methylsalicylic acid), and selected salt derivatives are effective stabilizers.

The generalized formulae are shown as derivatives of benzene. Derivatives of naphthalene would also be useful as stabilizers for polybutadiene resins as herein defined.

The value of $n$ in the generalized formula may have a value of one to four but the total carbon atoms comprising the group or groups will not generally exceed twenty-four.

In the case of an acid, ester or salt derivative of hydroxynaphthalene, the value of $n$ may vary from one to six but the total number of carbon atoms of the group or groups will not exceed about twenty-four carbon atoms.

The R' function of the ester formula may be an alkyl, aryl or substituted aryl group containing from one to 16 carbon atoms. If R' is an alkyl group, the carbon atoms may be arranged as a straight or branched chain or as a cyclic group. If R' is an aromatic function, the aromatic nucleus may also be substituted with straight or branched chain alkyl groups or with a cyclic structure or with another aromatic nucleus.

M is a metal cation having a valence of $x$. The remaining symbols of the three generalized formulae follow conventional chemical nomenclature.

Examples of the above type acids are salicyclic, 2-hydroxy-3-methylbenzoic, 2-hydroxy-4-methylbenzoic, 2-hydroxy-5-methylbenzoic and the corresponding ethyl, propyl, isopropyl, butyl, isobutyl, and tert.-butyl, etc. derivatives. Derivatives of 3-hydroxybenzoic acid in which the alkyl group would occupy the 2, 4, 5 or 6 position of 3-hydroxybenzoic acid are useful; the alkyl group may be methyl, ethyl, propyl, etc.

Other isomers of 2-hydroxybenzoic acid (salicylic acid) such as 3,4-dimethyl-2-hydroxybenzoic acid, 3,4-,5-trimethyl-2-hydroxybenzoic acid, 3,4,5,6-tretramethyl-2-hydroxybenzoic acid, the corresponding ethyl, propyl, etc. derivatives are also useful.

We have found that 3,5-di-tert.-butyl-4-hydroxybenzoic acid and 3,3'-methylenebis(5-methylsalicylic acid) are particularly effective stabilizers for the polybutadiene resins as herein defined.

Similarly, many possible alkyl, aryl or cyclicalkyl, or combinations thereof, esters of hydroxybenzoic or hydroxynaphthenic acid exist and should be useful for the stabilization of the polybutadiene resins as herein defined.

We have found that the 2,4-di-tert.-butylphenyl ester of 3,5-di-tert.-butyl-4-hydroxybenzoic acid as well as the pentaerythritol tetra ester of the acid are particularly effective stabilizers.

Many metal salts of hydroxyaryl carboxylic acids exist and should be useful as stabilizers for polybutadiene resins as herein defined.

We have found that the metals of Group II-A and II-B form particularly effective antidegradants with 3,5-di-tert.-butyl-4-hydroxybenzoic acid and with 3,3'-methylenebis(5-methylsalicylic acid).

The Cured Resins

The cured resins produced in accordance with this invention have exceptional resistance to deterioration of physical properties, particularly modulus and flexural strength, upon long time exposure at high temperatures, i.e., temperatures above 400°F. and up to 700°F. Thus, the products, upon thermoxidative exposure to temperatures of 400°F. for 1000 hours, or 600°F. for 100 hours, will retain upwards of 80% of their modulus and upwards of 60% of their flexural strength. The resins are therefore applicable in many situations where heat exposure is a factor, as in structural electrical components, cooking utensil handles, and automobile engine compartment components.

With the foregoing general discussion in mind, there are given herewith detailed experimental examples of the practice of this invention. All parts and percentages given are on the basis of weight, unless otherwise explicitly stated.

EXAMPLE I

| | Parts by Weight |
|---|---|
| Polybutadiene* | 100 |
| Silica | 380 |
| Vinyl triacetoxysilane | 3 |
| Dicumyl peroxide | 3 |
| Tetrahydrofuran (or Hexane) | 150 |
| Calcium stearate | 3 |
| Hydroxyaryl carboxylic acid or ester or metal salt | (per Tables) |

*90% of butadiene units in 1,2-configuration; molecular weight parameters $M_w = 29,000$, $M_n = 23,000$, DSV = 0.3.

A series of compositions was made up in accordance with the above schedule, varying the carboxylic acid, ester or salt in the several compositions as indicated in the following tables. In the case of each composition, all of the ingredients, in the proportions selected for that composition, were thoroughly mixed together, and the mixture poured into an evaporating dish to the depth of 0.5 inch. The dish was then placed in a vacuum oven, where the tetrahydrofuran (or hexane) was removed at 125°F. under a pressure of 1–5 mm. of mercury absolute. Each such dried composition was then removed and broken up, and molded in a compression mold into several test bars 1 inch × 3 inches × 0.1 inch. The temperature of molding was 350°F., total load on the die was 10–20 tons normal to the 1 inch × 3 inches face, and time was four minutes. The modulus and flexural strength was determined upon control bars from each composition, and the average recorded in the tables.

The use of tetrahydrofuran or hexane solvent was a matter of convenience for the preparation of relatively small laboratory samples. On an industrial scale, the tetrahydrofuran or hexane would not be needed. The components would be dry-mixed by known industrial procedures.

As shown by the data summarized in Table I, all of the experimental stabilizers imparted better stabilization to the resins than the control which did not contain a stabilizer (Sample No. 1).

The free acid; 3,5-di-tert.-butyl-4-hydroxybenzoic acid, (Sample No. 2) significantly increased the absolute as well as relative (percent retained) values of flexural modulus and strength of the control sample. The Mg, Ca, Ba, Zn and Ni salts were also effective stabilizers.

The 2,4-di-tert.-butylphenyl ester as well as the pentaerythritol tetra ester of 3,5-di-tert.-butyl-4-hydroxybenzoic acid (Samples No. 8 and 9, respectively) was also very effective in stabilizing the resin.

TABLE I

STABILIZING EFFECTS OF 3,5-DI-TERT.-BUTYL-4-HYDROXYBENZOIC ACID, SALTS AND ESTERS

| | Forced Air Oven Aging at 600°F., 100 Hours | | | | | |
|---|---|---|---|---|---|---|
| | Flexural Modulus psi ×10⁻⁶ | | | Flexural Strength psi | | |
| Sample No. | Unaged | Aged | % Retained | Unaged | Aged | % Retained |
| 1. Control, no stabilizer* | 1.36 | 0.89 | 65 | 11,100 | 6,700 | 60 |
| Control plus 2.0 phr of: | | | | | | |
| 2. Free Acid | 1.36 | 1.18 | 87 | 10,600 | 7,950 | 75 |
| 3. Mg Salt | 1.50 | 1.22 | 81 | 12,300 | 9,050 | 74 |
| 4. Ca Salt | 1.41 | 1.15 | 82 | 11,400 | 7,100 | 62 |
| 5. Ba Salt | 1.60 | 1.16 | 73 | 11,400 | 8,300 | 73 |
| 6. Zn Salt | 1.45 | 1.21 | 83 | 12,600 | 7,850 | 62 |
| 7. Ni Salt | 1.38 | 1.18 | 86 | 11,500 | 8,850 | 77 |
| 8. Ester No. 1 | 1.40 | 1.03 | 74 | 11,500 | 7,400 | 64 |
| 9. Ester No. 2 | 1.37 | 1.12 | 82 | 12,200 | 9,300 | 76 |

*Average of four runs
Ester No. 1 is the 2,4-di-tert.-butylphenyl ester.
Ester No. 2 is the pentaerythritol tetra ester.

TABLE II

STABILIZING EFFECTS OF 3,3'-METHYLENE BIS(5-METHYLSALICYLIC ACID) AND SALTS

| | Forced Air Oven Aging at 600°F., 100 Hours | | | | | |
|---|---|---|---|---|---|---|
| | Flexural Modulus psi ×10⁻⁶ | | | Flexural Strength psi | | |
| Sample No. | Unaged | Aged | % Retained | Unaged | Aged | % Retained |
| 1. Control, no stabilizer* | 1.48 | 0.87 | 59 | 12,000 | 6,700 | 56 |
| Control, plus 2.0 phr of: | | | | | | |
| 2. Free Acid | 1.35 | 0.77 | 57 | 10,900 | 6,400 | 59 |
| 3. Mg Salt | 1.30 | 0.99 | 76 | 11,900 | 6,900 | 58 |
| 4. Ca Salt | 1.37 | 1.15 | 84 | 10,600 | 7,300 | 69 |
| 5. Zn Salt | 1.42 | 1.10 | 77 | 10,300 | 8,600 | 83 |

*Average of three runs.

The stabilizing effectiveness of 3,3'-methylenebis(5-methylsalicylic acid) salts is indicated by the data summarized in Table II. It will be noted that the free acid had no significant beneficial effect on stability; however, the Mg, Ca and Zn salts are effective stabilizers. The Ca and Zn salts are particularly effective.

What is claimed is:

1. Process of producing a resin having a high resistance to thermo-oxidatise deterioration of its mechanical properties, which comprises subjecting to curing temperatures a composition containing

| | Parts by Weight |
|---|---|
| A butadiene polymer or copolymer resin | 100 |
| Vinyl triacetoxysilane | 0.05–5.0 |
| Silica | 100–500 |
| A hydroxyaryl carboxylic acid or salt or ester thereof | 0.5–5.0 |
| Calcium stearate | 0.5–5.0 |
| Dicumyl peroxide | 0.5–6.0 | the resin being a homopolymer of butadiene or a copolymer of butadiene and styrene and containing at least 40% by weight of butadiene, and at least 80% of butadiene repeating units in the homopolymer or copolymer being in the 1,2-configuration.

2. Process according to claim 1, wherein the hydroxyaryl carboxylic acid is 3,5-di-tert.-butyl-4-hydroxybenzoic acid.

3. Process according to claim 1, wherein the hydroxyaryl carboxylic acid salt is the Mg, Ca, Ba, Zn or Ni salt of 3,5-di-tert.-butyl-4-hydroxybenzoic acid.

4. Process according to claim 1, wherein the hydroxyaryl carboxylic acid salt is the Mg, Ca or Zn salt of 3,3'-methylenebis(5-methylsalicylic acid).

5. Process according to claim 1, wherein the ester of the hydroxyaryl carboxylic acid is the 2,4-di-tert.-butylphenyl ester or the pentaerythritol tetra ester.

6. A composition curable to a hard resin having enhanced resistance to thermo-oxidatise deterioration of its mechanical properties, which composition comprises

| | Parts by Weight |
|---|---|
| A butadiene polymer or copolymer resin | 100 |
| Vinyl triacetoxysilane | 0.05–5.0 |
| Silica | 100–500 |
| A hydroxyaryl carboxylic acid or salt or ester thereof | 0.5–5.0 |
| Calcium stearate | 0.5–5.0 |
| A peroxide curing agent | 0.5–6.0 | the resin being a homopolymer of butadiene or a copolymer of butadiene and styrene and containing at least 40% by weight of butadiene, and at least 80% of butadiene repeating units in the homopolymer or copolymer being in the 1,2-configuration.

7. Composition according to claim 6, wherein the hydroxyaryl carboxylic acid is 3,5-di-tert.-butyl-4-hydroxybenzoic acid.

8. Composition according to claim 6 wherein the hydroxyaryl carboxylic acid salt is the Mg, Ca, Ba, Zn or Ni salt of 3,5-di-tert.-butyl-4-hydroxybenzoic acid.

9. Composition according to claim 6 wherein the hydroxyaryl carboxylic acid salt is the Mg, Ca or Zn salt of 3,3'-methylenebis(5-methylsalicylic acid).

10. Composition according to claim 6 wherein the ester of the hydroxyaryl carboxylic acid is the 2,4-di-tert.-butylphenyl ester or the pentaerythritol tetra ester.

11. A peroxide-cured resin highly resistant to thermo-oxidatise deterioration of physical properties, said resin containing therein

| | Parts by Weight |
|---|---|
| A butadiene polymer or copolymer resin | 100 |
| Vinyl triacetoxysilane | 0.05–5.0 |
| Silica | 100–500 |
| Hydroxyarylcarboxylic acid or salt or ester thereof | 0.5–5.0 |
| Calcium stearate | 0.5–5.0 | the resin being a homopolymer or copolymer of butadiene and styrene and containing at least 40% by weight of butadiene, and at least 80% of butadiene repeating units in the homopolymer or copolymer being in the 1,2-configuration.

12. Composition according to claim 11, wherein the hydroxyaryl carboxylic acid is 3,5-di-tert.-butyl-4-hydroxybenzoic acid.

13. Composition according to claim 11, wherein the hydroxyaryl carboxylic acid salt is the Mg, Ca, Ba, Zn or Ni salt of 3,5-di-tert.-butyl-4-hydroxybenzoic acid.

14. Composition according to claim 11, wherein the hydroxyaryl carboxylic acid salt is the Mg, Ca or Zn salt or 3,3'-methylenebis(5-methylsalicylic acid).

15. Composition according to claim 11, wherein the ester of the hydroxyaryl carboxylic acid is the 2,4-di-tert.-butylphenyl ester or the pentaerythritol tetra ester.

* * * * *